April 12, 1949.   H. B. COWGILL, JR   2,467,112
PICKUP APPARATUS FOR AERIAL CARGOS
Filed April 18, 1945   2 Sheets-Sheet 2
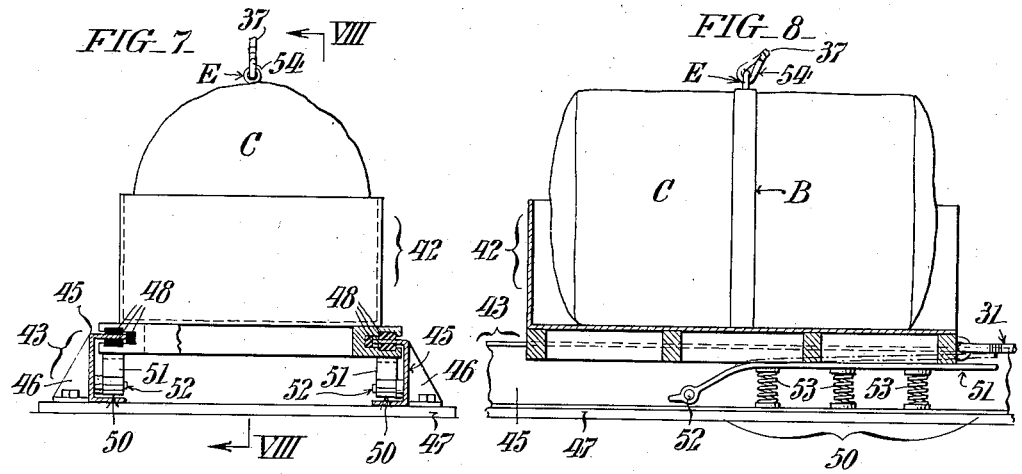
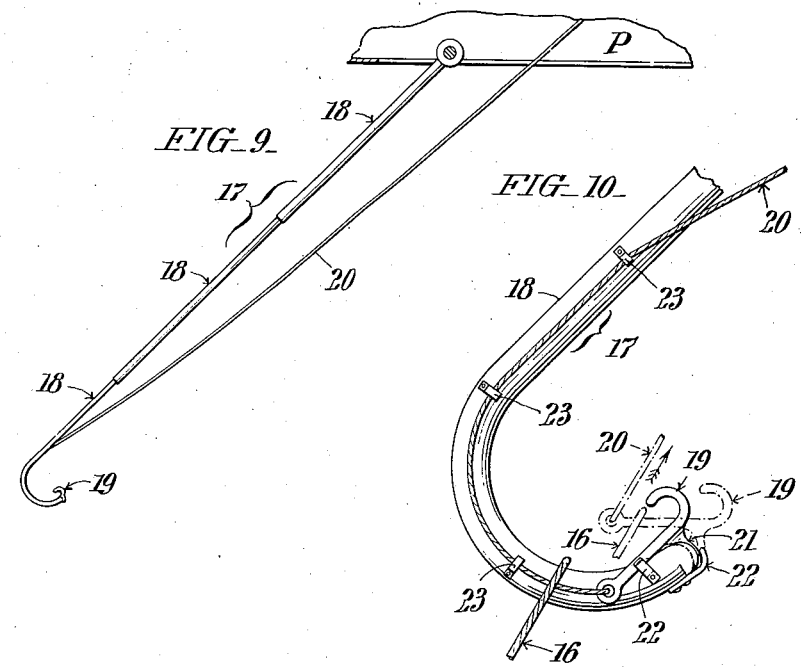
INVENTOR:
Harry B. Cowgill, Jr.,
BY Paul & Paul
ATTORNEYS.

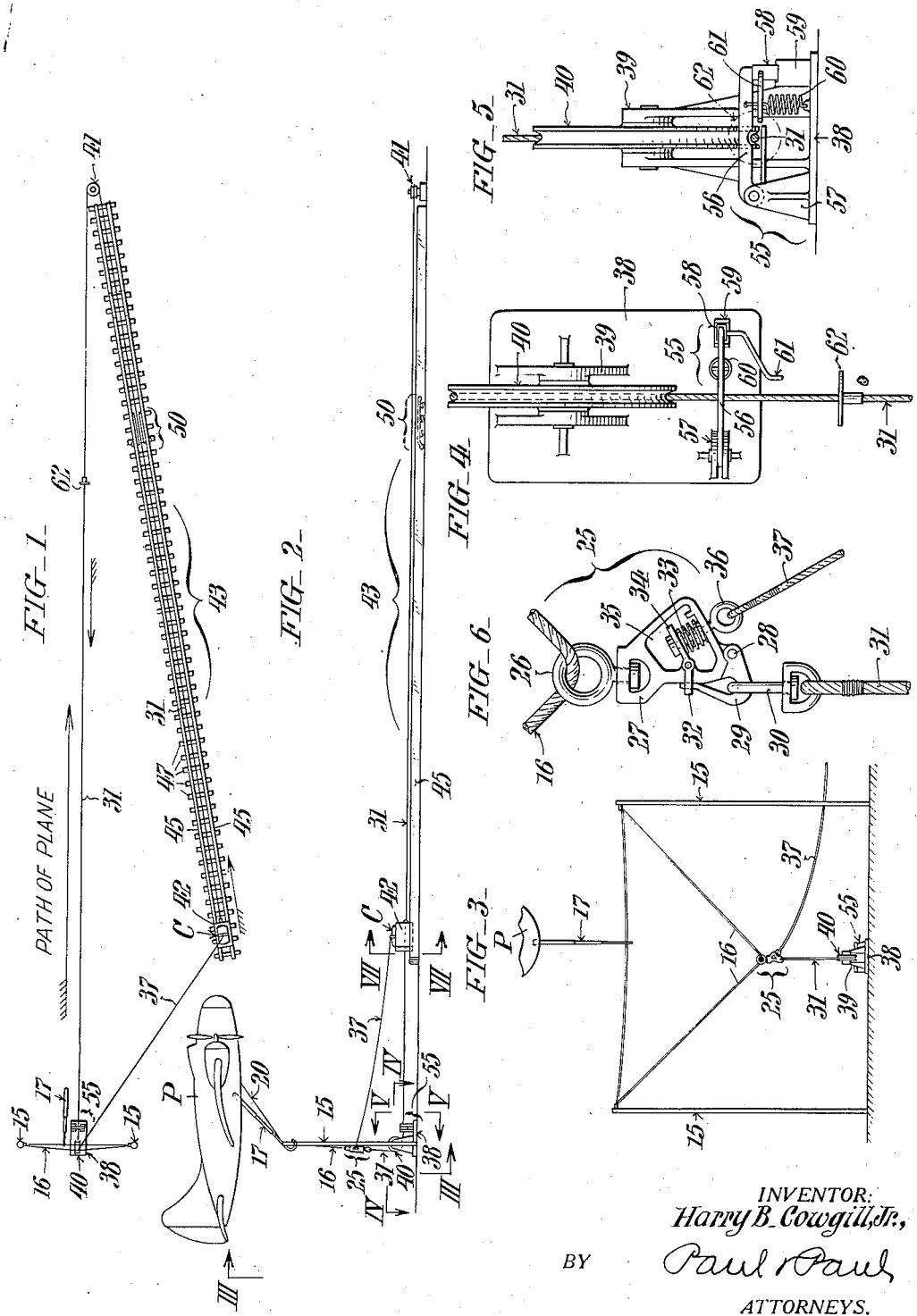

Patented Apr. 12, 1949

2,467,112

UNITED STATES PATENT OFFICE 2,467,112

PICKUP APPARATUS FOR AERIAL CARGO

Harry B. Cowgill, Jr., Rockville Centre, N. Y.

Application April 18, 1945, Serial No. 588,919

5 Claims. (Cl. 258—1.6)

This invention relates to systems or apparatus useful in picking up cargo from the ground by air craft in flight.

Various attempts have been made to pick up cargo without necessitating landing of air craft, but the systems heretofore designed for the purpose were complicated and involved the use of cables which were too long and unwieldly to be practical and therefore likely to become easily deranged or tangled, and which moreover entailed dragging of the cargo on the ground over correspondingly long distances before it could be lifted into the flying craft.

My invention has for its chief aim to overcome the foregoing drawbacks, that it is to say to make possible the taking of cargo from the ground by a flying craft with surety and in such a way as to minimize the likelihood of accidents with injury to the crew of the craft or damage to the cargo. This objective is realized in practice as hereinafter more fully described, through provision of simple apparatus which is devoid of reels or other complicated winding devices; in which an elastic accelerating cable is connected at one end to a loop adapted to be picked up by an over traveling air craft and at the other end to an open top ground rail-guided carriage for cargo in the form of a package; and in which a relatively short flexible haul-in cable is attached to the cargo and likewise conected to the loop; and in which, as the package is eventually lifted out of the carriage at a time when the speed of the latter approximates that of the air craft, the accelerating cable is automatically loosed from the pick-up loop to free the carriage from connection to the air craft.

In connection with a cargo pick-up system having the above attributes, I further aim to provide for automatic braking of the carriage as it nears the end of its prescribed run, as well as means for severing the accelerating cable in the event of failure in the automatic disconnection of the latter from the pick-up loop at the proper time to prevent the carriage from being pulled away by the air craft.

Other objects and attendant advantages will appear from the following detailed description of the attached drawings, wherein Fig. 1 shows the top plan of a cargo pick-up apparatus conveniently embodying my invention.

Fig. 2 shows the organization in side elevation with an airplane in flight and about to pick up the cargo.

Fig. 3 is an end view looking as indicated by the angled arrows III—III in Fig. 2.

Figs. 4 and 5 are detail views on a larger scale in plan and in end elevation looking as respectively indicated by the angled arrows IV—IV and V—V in Fig. 2 of a combined guide means for the carriage accelerating cable and a safety mechanism for cutting the cable in case of mal operation of the apparatus.

Fig. 6 is a larger scale detail view of an automatically releasable hook by which the accelerating cable is connected to the catch loop of the haul-in cable.

Fig. 7 is a larger scale cross section taken as indicated by the angled arrows VII-VII in Fig. 2, of the track for the ground carriage into which the cargo is initially placed.

Fig. 8 is a longitudinal sectional view taken as indicated by the angled arrows VIII—VIII in Fig. 7.

Fig. 9 is a view in side elevation likewise drawn to a larger scale and showing the catch hook and an operating cable therefor which I have provided on the airplane; and Fig. 10 is a fragmentary view on a still larger scale showing the catch hook in greater detail.

As herein delineated, my improved cargo pickup apparatus includes a pair of laterally-spaced supporting standards or posts 15 (Figs. 1–3) from the tops of which a pick-up loop 16 is loosely hung in readiness to be caught and taken by a projection in the form of an elongate hook 17 pivotally suspended from the body of an over-passing airplane P. From Figs. 9 and 10 it will be observed that the shank of the hook 17 is composed of several telescopically interengaged sections 18, and that with said hook is associated a smaller auxiliary hook 19 which is secured to the end of a hoisting cable 20 and has a lug-projection 21 curved to fit over the rounded nose end of the main hook 17. Spring clips 22 and 23 respectively are relied upon to releasably hold the auxiliary hook 19 and the immediately adjacent end portion of the cable in place on the main hook 17 as shown in full lines in Fig. 10.

At 25 in Figs. 2, 3 and 6 is indicated a coupling element, which, through an eye 26 swivelly connected to the top of its body 27 is slidably engaged with the pick-up loop 16. Fulcrumed at 28 on the lower end of the body 27 of the coupling element 25 is a self-opening gravity hook 29 for engagement by a swivel eye 30 at one end of an elastic accelerating cable 31 of nylon or the like which will again be referred to presently. For the purpose of normally holding the hook 29 closed I have provided a pivoted keeper 32 which is yieldingly held in the position shown by a helical spring 33 compressed between the tail 34 of said keeper and the bottom of a lateral opening 35 in the body 27 of the coupling element 25. Both the keeper tail 34 and the body 27 are apertured for passage of the headed shank of a swivel eye 36 whereto one end of a flexible haul-in cable 37 is permanently attached. This haul-in cable 37 may likewise be of nylon or the like and will also be referred to again presently.

Located centrally between the posts 15 is a base 38 from which rises a bearing standard 39 for a horizontal axis sheave 40 about which the accelerating cable 31 is trained to pass vertically downwardly from the loop and then horizontally forwardly (as considered with respect to the direction of plane flight indicated by the large arrow in Fig. 1) to a vertical axis pulley 41 disposed at a substantial distance from the sheave 40. As previously explained, one end of the accelerating cable 31 is engaged in the hook 29 of the coupling member 25, its other end being fixedly connected to a slide carriage 42 which is confined to a track 43 arranged along a line radial to the sheave 41 immediately beyond its front end at an acute angle to the line of intended flight as shown in Fig. 1. The channel rails 45 of the track 43 are arranged with their flanges facing inwardly, see Figs. 7 and 8, and supported by brackets 46 from suitably spaced ties 47. As further shown in Fig. 7, the side edges of the bottom or foundation frame of the carriage are longitudinally recessed for retainment of liners 48 of "Insurock" or the like which bear against the top and bottom surfaces of the upper guide flanges of the track rails 45.

Located at a point well toward the outer (right-hand) end of the track 43 (Figs. 1 and 2) is a braking means 50 for the details of which reference will again be had to Figs. 7 and 8. As there illustrated, this braking means 50 includes a pair of friction shoes 51, which, in practice, may be fashioned from heavy bar metal each with one end fulcrumed for up and down movement on studs 52 projecting inwardly from the rails 45, being yieldingly urged upwardly by springs 53.

The cargo to be picked up is exemplified as a bundle C (Figs. 1, 2, 7 and 8) with an encircling band B and an eye E for engagement by a snap hook 54 at the remote or outer end of the haul-in cable 37.

Mounted on the base 38 with the sheave 40 (Figs. 1-5) is a device 55 for severing the accelerating cable 31 to free the car 42 from the plane during or at the conclusion of the pick-up operation and thereby obviate mishaps in the event of failure of the apparatus. Briefly described, the severing device 55 comprises a knife blade 56 which normally lies crosswise above the accelerating cable 31 and which is fulcrumed to an upstanding bracket 57 on the base 38 with its free end resting on a displaceable trip block 58 interposed between it and a pad 59 on said base. The knife blade 56 is biased downwardly by a spring 60, and the block 58 provided with an extended arm projection 61 placed so as to be in the path of a trip collar 62 on the cable 31.

The operation of the apparatus is as follows: As the plane P travels overhead, it is maneuvered so that its pick-up hook 17 which was previously lowered, engages the pick-up loop 16 hanging loosely from the supporting posts 15. In being carried along by virtue of its connection to the loop 16 by the coupling element 25, the accelerating cable 31 is strained and in stretching gradually accelerates the slide car 42 containing the package C. With passage of the plane P over the gradually accelerating carriage 42, the haul-in cable 37 is slack, but as the plane moves on and leads the carriage it becomes taut and eventually lifts the cargo from said carriage at about the time the latter nears the end of its prescribed run on the track 43. The tension induced in the haul-in cable 37 by the weight of the package C is effective in actuating the keeper 32 associated with the coupling element 25 to free the hook 29, which, in swinging downward, releases said cable. In its further travel, the car 42 encounters the friction members 51 of the brake means 50 and is thereby gently brought to rest, leaving the cargo suspended by the loop 16 and the haul-in cable 37 from the airplane P, with said loop caught in the auxiliary hook 19 associated with the main pick-up hook 17 and attached to the end of the hoisting cable 20. With the cargo now suspended, the cable 20 (Fig. 10) is first pulled out of the clips 23. The small hook 19 then pivots on lug 21 and in so doing engages the loop 16, when, upon further pulling, said lug detaches itself from clip 22 and the cargo is hauled aboard. With this accomplished, the hook 18 is collapsed and in turn swung aboard.

If during the pick-up, the hook 29 of the coupling element 25 should fail to open and release the accelerating cable 31, the latter will be severed upon encounter of the stop 62 thereon with the trip block 58 by which the knife 56 is released. As a consequence under these circumstances only a portion of the accelerating cable 31 will be taken away with the cargo, but the carriage 42 allowed to remain on the ground.

It is to be particularly noted that the design of the apparatus is such as to make possible the use of a relatively short haul-in cable 37, the length of which is such as will insure support of the cargo well before the carriage 42 attains the speed of the plane, so that a substantial part of the acceleration is accomplished by stretching of this cable while the cargo is suspended in the air. Thus, the size (diameter) of the cables 31 and 37, their relative lengths and the material from which they are made are important considerations for the successful picking up of cargo in accordance with my invention. The use of a short haul-in cable is further advantageous in that it precludes excessive vibration or whipping about of the cargo while it is suspended in the air, in that it lessens the danger of striking ground obstructions, and in that it permits pick-ups to be more readily made in congested districts or areas.

Having thus described my invention, I claim:

1. Cargo pick-up apparatus of the character described including means for supporting a pick-up loop at an elevation above ground in a condition ready to be caught and removed by a projection pendent from an over-traveling air craft; an open carriage for cargo in package form; a track in advance of the supporting means as considered with respect to the direction of flight to which the car is confined; an elastic accelerating cable connected at one end to the front of the carriage; and a hook by which the other end of the cable is connected to the pick up loop, said hook having a keeper by which it is releasable; a vertical axis sheave at the front end of the track and a horizontal axis sheave at the loop support about which the cable passes; and an initially slack haul-in cable extending rearwardly from the package in the carriage and having its end connected to the releasing keeper of the hook, said keeper releasing said hook when the haul-in cable is tensioned as the package is eventually lifted from the carriage to disconnect the carriage accelerating cable from said loop.

2. Pick-up apparatus according to claim 1, further including means for automatically checking the speed of the carriage upon disconnection of the accelerating cable from the pick-up loop.

3. Pick-up apparatus according to claim 1, further including means for automatically severing the accelerating cable in the event that the releasing keeper of the hook fails to operate.

4. Pick-up apparatus according to claim 1, in which the carriage is slidably held to the track rails, and further including upwardly spring biased braking elements for frictionally engaging the carriage from beneath to bring it to rest upon disconnection of the accelerating cable from the pick-up loop.

5. Pick-up apparatus according to claim 1, further including means for automatically severing the accelerating cable before the carriage reaches the outer end of the track in the event that the releasing keeper of the hook fails to operate, said means comprising a pivoted spring biased knife blade normally positioned above said cable out of contact with the latter; a trippable member normally beneath the swinging end of the blade, and a stop projection on said cable to cooperate with said trippable member.

HARRY B. COWGILL, Jr.

REFERENCES CITED

The following references are of record in the file of this patent:

UNITED STATES PATENTS

| Number | Name | Date |
|---|---|---|
| 1,070,197 | Snell | Aug. 12, 1913 |
| 1,602,851 | Holt | Oct. 12, 1926 |
| 1,818,834 | Zimmerman | Aug. 11, 1931 |
| 2,014,557 | Clampitt | Sept. 17, 1935 |
| 2,102,604 | Arndt | Dec. 21, 1937 |
| 2,319,881 | Ray | May 25, 1943 |
| 2,334,979 | Adams | Nov. 23, 1943 |
| 2,341,324 | Ingres | Feb. 8, 1944 |